(12) United States Patent
Biebel et al.

(10) Patent No.: US 7,788,929 B2
(45) Date of Patent: Sep. 7, 2010

(54) COMBUSTION CHAMBER END WALL WITH VENTILATION

(75) Inventors: Romain Biebel, Le Coudray Montceau (FR); Claude Gautier, Savigny le Temple (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 966 days.

(21) Appl. No.: 11/560,151

(22) Filed: Nov. 15, 2006

(65) Prior Publication Data

US 2007/0113556 A1    May 24, 2007

(30) Foreign Application Priority Data

Nov. 15, 2005    (FR) ................... 05 11549

(51) Int. Cl.
*F02C 1/00* (2006.01)
*F02G 3/00* (2006.01)

(52) U.S. Cl. .......................... 60/756; 60/752

(58) Field of Classification Search ............... 60/737, 60/740, 748, 752–760
See application file for complete search history.

(56) References Cited

U.S. PATENT DOCUMENTS

| | | | |
|---|---|---|---|
| 4,180,974 A | | 1/1980 | Ekstedt et al. |
| 4,322,945 A | | 4/1982 | Peterson et al. |
| 4,914,918 A | | 4/1990 | Sullivan |
| 4,999,996 A | * | 3/1991 | Duchene et al. ............... 60/798 |
| 5,172,545 A | * | 12/1992 | Forestier ...................... 60/800 |
| 5,329,761 A | | 7/1994 | Ablett et al. |
| 5,765,376 A | * | 6/1998 | Zarzalis et al. ................ 60/748 |
| 5,894,732 A | | 4/1999 | Kwan |
| 5,941,076 A | * | 8/1999 | Sandelis ...................... 60/752 |
| 5,956,955 A | | 9/1999 | Schmid |
| 6,035,645 A | * | 3/2000 | Bensaadi et al. .............. 60/742 |
| 6,442,940 B1 | | 9/2002 | Young et al. |

(Continued)

FOREIGN PATENT DOCUMENTS

EP    1 408 280 A2    4/2004

(Continued)

OTHER PUBLICATIONS

U.S. Appl. No. 12/199,182, filed Aug. 27, 2008, Pieussergues, et al.

*Primary Examiner*—William H Rodriguez
(74) *Attorney, Agent, or Firm*—Oblon, Spivak, McClelland, Maier & Neustadt, L.L.P.

(57) ABSTRACT

A combustion chamber having a chamber end wall that presents a plurality of air and fuel injector devices, each of the devices including a bowl and a deflector mounted on a main axis forming a heat shield disposed around the bowl which flares in the gas flow direction and possesses an annular portion, the interface between the bowl and the deflector being situated on this annular portion, at least a portion of the interface being situated towards the end of the annular portion that is downstream in the gas flow direction, such that an annular cavity is defined between the deflector and the downstream annular portion of the interface. First bowl holes are formed in the annular portion to open out facing the edge of the chamber end wall that is in contact with the deflector in order to sustain a flow of air from upstream to downstream in the annular cavity.

20 Claims, 4 Drawing Sheets

U.S. PATENT DOCUMENTS

| | | | |
|---|---|---|---|
| 6,735,950 B1 * | 5/2004 | Howell et al. | 60/748 |
| 7,114,337 B2 * | 10/2006 | Cazalens et al. | 60/737 |
| 2003/0131600 A1 * | 7/2003 | David et al. | 60/737 |
| 2007/0084215 A1 * | 4/2007 | Hernandez et al. | 60/796 |
| 2007/0125085 A1 * | 6/2007 | Commaret et al. | 60/748 |
| 2007/0169486 A1 * | 7/2007 | Hernandez et al. | 60/776 |
| 2008/0178598 A1 * | 7/2008 | Commaret et al. | 60/748 |
| 2009/0151359 A1 * | 6/2009 | Cayre et al. | 60/740 |

FOREIGN PATENT DOCUMENTS

FR     2 678 715 A1     1/1993

* cited by examiner

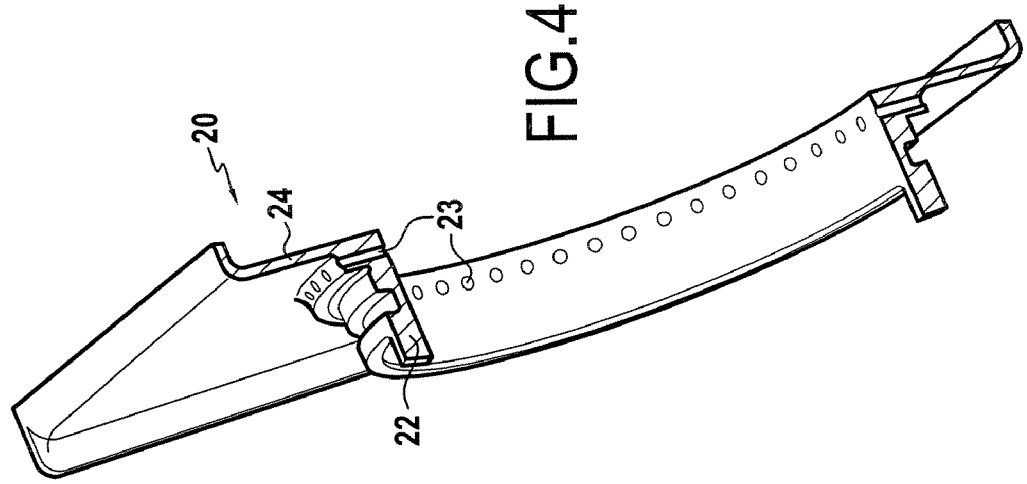
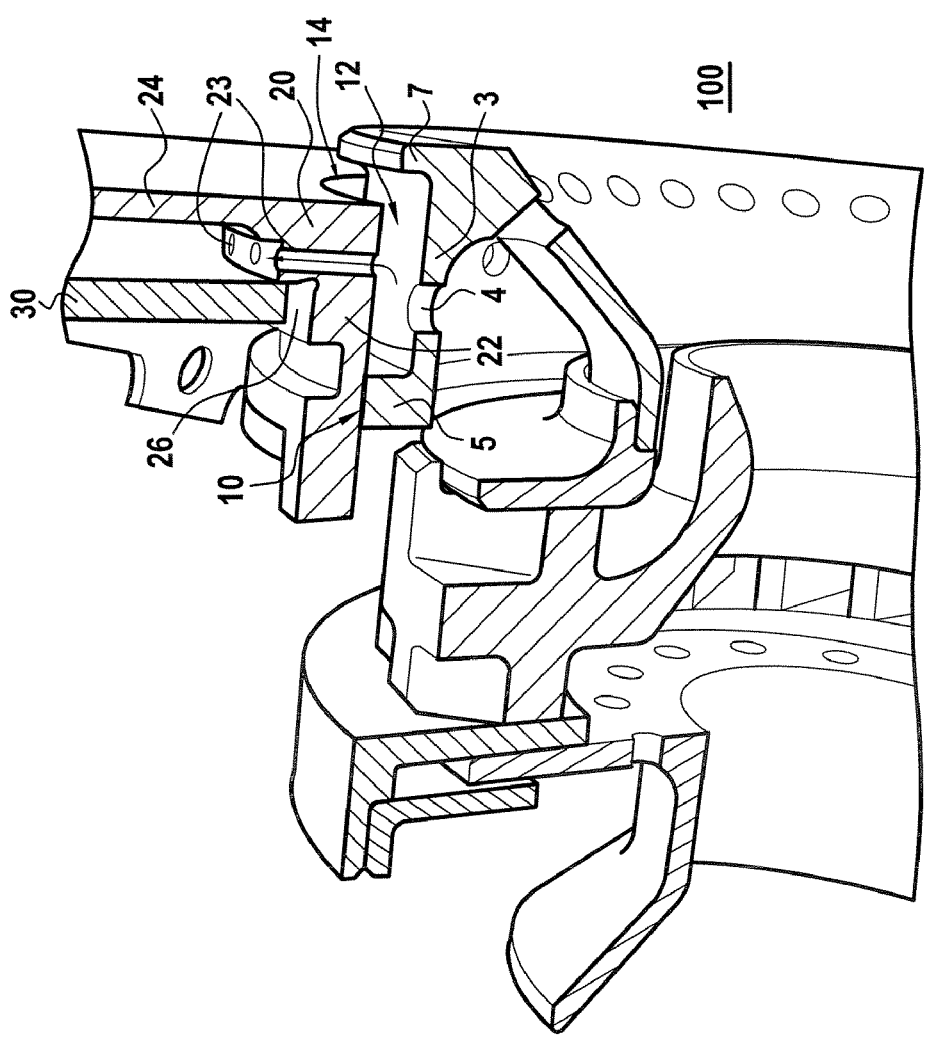

COMBUSTION CHAMBER END WALL WITH VENTILATION

The present invention relates to the field of combustion chambers for aviation turbomachines.

The invention relates more particularly to the field of turbomachine combustion chambers of the kind having a chamber end wall that presents a plurality of air and fuel injector devices, each of said devices comprising, mounted on a main axis, a bowl and a deflector forming a heat shield disposed around said bowl, said bowl being flared in the gas flow direction and possessing an annular portion, the interface between said bowl and said deflector being situated on said annular portion.

BACKGROUND OF THE INVENTION

In a combustion chamber of a turbomachine, a combustion reaction occurs between the fuel and the oxygen of the air. This results in the hot gas produced by the combustion being expelled at high speed, which gas delivers thrust on expanding. It is this thrust that serves, for example, to propel an airplane fitted with one or more turbomachines. Typically, a combustion chamber is annular and is fitted around its circumference with a plurality of fuel injector devices that are mounted in circular holes in the end wall. Each device opens out into the combustion chamber at an end referred to as a bowl, having the shape of a bowl that flares in the gas flow direction, while air penetrates continuously into the chamber so as to be mixed with the injected fuel. Since the end wall of the combustion chamber is in the immediate proximity of the injector devices that it carries, it is subjected to high temperatures. An end wall is thus provided around the periphery of each bowl with a deflector for protecting the end wall from high temperatures, typically by creating an insulating layer of air between the deflector and the end wall. In order to improve the insulating ability of this layer of air, it is conventional practice to pierce the deflector and/or the end wall with orifices situated close to the circumference of the bowl, so as to maintain in said layer a flow of cooler air coming from outside the combustion chamber.

In certain combustion chamber configurations, the bowl includes an annular portion having the root of the deflector secured thereto, with the other portion of the deflector being a plane portion perpendicular to the main axis of the bowl, situated downstream from the end wall. However that interface between the annular portion of the bowl and the root of the deflector leads to undesirable heating of the end wall by conduction via the interface.

OBJECT AND SUMMARY OF THE INVENTION

The present invention seeks to mitigate those drawbacks.

The invention seeks to provide a combustion chamber in which the annular portion of the bowl and the deflector are of a shape that enables the end wall of the chamber to be cooled sufficiently for the temperature thereof to remain below a critical value while the combustion chamber is in operation.

This object is achieved by the fact that at least a portion of the interface between the annular portion of the bowl and the deflector is situated towards the end of the annular portion that is upstream in the gas flow direction, and an annular cavity is defined between the deflector and the annular portion downstream from the interface, first bowl holes being formed through the annular portion to open out in register with the edge of the chamber end wall that is in contact with the deflector in order to sustain a flow of air from upstream to downstream in the annular cavity, the air passing through the first holes coming to impact directly against the portion of the deflector that is in contact with the edge of the end wall.

By means of these dispositions that avoid the necessarily expensive and lengthy procedure of designing a new connection system between the bowl and the deflector, both the root of the deflector and the annular portion are cooled by convection by means of a flow of air coming from outside the combustion chamber. This serves to make the temperature of the end wall more uniform by reducing heat flow by conduction by reducing contact areas at the interface and by ventilating the deflector via the bowl interface, thereby obtaining better mechanical behavior. When the bowl possesses a collar at its downstream end, the invention makes it possible to obtain more efficient cooling of the collar. In addition, removing material from the interface and providing holes produces a weight saving.

Advantageously, all of the interface is situated towards the end of the annular portion that is situated upstream in the gas flow direction, such that the cavity opens out via an annular orifice into the combustion chamber.

This configuration enables the air coming from outside the combustion chamber to cool the downstream portion of the deflector, thereby limiting coke deposition on the deflector.

Advantageously, the annular portion possesses an annular rib towards its downstream end, which rib is in contact with the deflector over a contact zone that constitutes the remaining portion of the interface, the annular rib being pierced by second bowl holes, the air coming from the annular cavity being capable of flowing through the second holes so as to cool the downstream end of the bowl.

This configuration enables air coming from outside the combustion chamber to cool the downstream end of the bowl by impact, and also to cool the collar by impact, if the bowl has one.

Advantageously, the deflector is pierced by holes enabling air coming from the annular cavity to penetrate between the deflector and the chamber end wall.

The presence of these holes enables the cooler air coming from outside the combustion chamber to flow directly between the end wall of the chamber and the deflector, and thus improve the insulating ability of the layer of air situated between the end wall and the deflector.

BRIEF DESCRIPTION OF THE DRAWINGS

The invention can be better understood and its advantages appear more clearly on reading the following detailed description of an embodiment given by way of non-limiting example. The description refers to the accompanying drawings, in which:

FIG. 3 is a perspective and section view of the chamber end wall, of the deflector, and of the bowl of the invention, when the deflector is pierced by holes;

FIG. 4 is a perspective and section view of the deflector of the invention, when the deflector is pierced by holes;

MORE DETAILED DESCRIPTION

Figure 2:
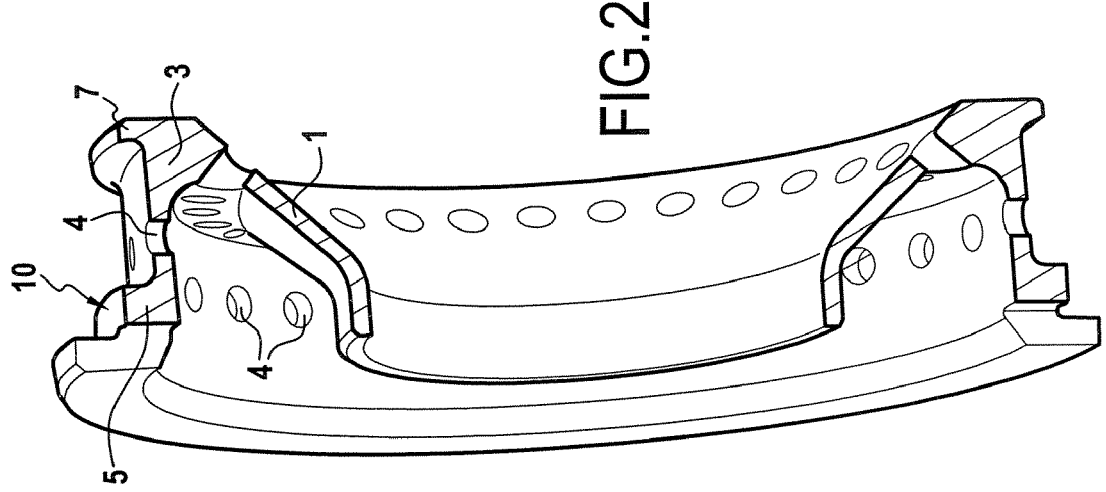
FIG. 2 is a perspective and section view of the bowl of the invention.
Figure 1:
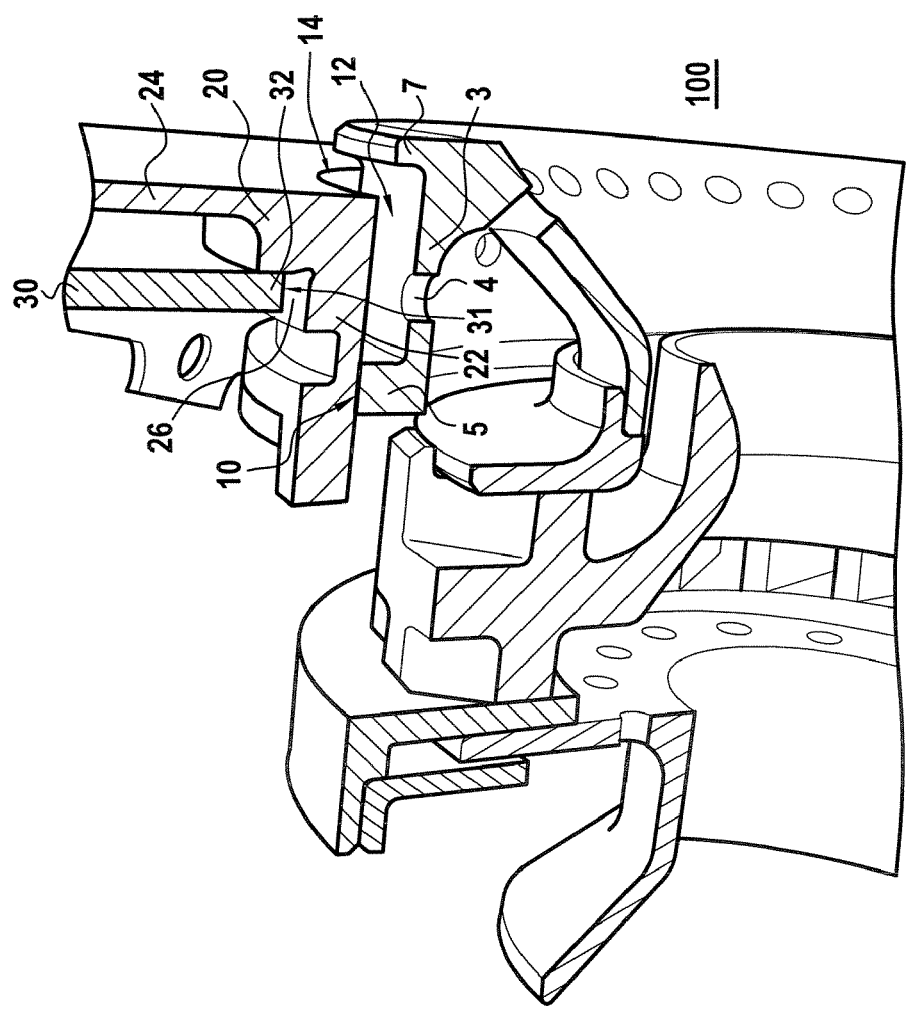
FIG. 1 is a perspective and section view of the chamber end wall, the deflector, and the bowl of the invention, when the entire interface is situated towards the upstream end of the annular portion.

As shown in FIGS. 1 and 2, the bowl 1 possesses an annular portion 3 that extends from the downstream end of the bowl 1 in the upstream direction relative to the flow of gas. Around the bowl 1 there is attached the deflector 20 which possesses a root 22 parallel to the main axis of the bowl, and downstream from its root 22, a plane portion 24 perpendicular to the main axis of the bowl. The deflector 20 is mounted in one of the circular holes 31 in the end wall of the chamber 30. The upstream portion 5 of the annular portion 3 is in contact with the root 22 of the deflector 20 via a first annular contact zone 10 which constitutes the interface between the annular portion 3 and the deflector 20. This defines an annular cavity 12 between the annular portion 3 and the root 22 of the deflector 20. The annular cavity 12 opens out to the combustion chamber 100 via an annular orifice 14 defined by the plane downstream portion 24 of the deflector 20 and the downstream end of the annular portion 3. For the bowl shown in FIG. 1, the downstream end of the bowl 1 (i.e. the downstream end of the annular portion 3) has a collar 7. The end wall 30 is in contact with an outside face 26 of the root 22 of the deflector 20 via the edge 32 of each of the circular holes 31 in the end wall of the chamber. The annular portion 3 is pierced by first bowl holes 4 that open out facing the edge 32 of the end wall 30. In the example shown, the first holes 4 are circular and their axes extend radially relative to the axis of the bowl. The first holes 4 could equally well be perpendicular to said main axis with a circumferential inclination. They could equally be in the form of slots or of any other shape.

The cooler air coming from outside the chamber penetrates into the annular cavity 12 via the first holes 4. Because of the position of the first holes 4 facing the edge 32 of the end wall 30, air impacts directly against the portion of the root 22 of the deflector, thereby achieving more effective cooling of the marginal zone immediately adjacent to the edge 32 of the end wall 30, compared with having first bowl holes 4 in some other position. This configuration is advantageous since the marginal zone immediately adjacent to the edge 32 is subjected to high temperatures due to the heating of the bowl 1. The air then emerges from the annular cavity 12 via its annular orifice 14 into the combustion chamber 100. When said downstream end of the annular portion 3 is provided with a collar, the flow of air emerging from the downstream orifice 14 is deflected by the collar 7 in a radial direction, thereby causing the flow of air to travel along the plane downstream portion 24 of the deflector 20. This flow of cooler air along the plane downstream portion 24 serves to limit coke deposition thereon.

FIG. 2 shows the shape of the bowl 1 on its own and of its annular portion 3 pierced by its first holes 4.

FIG. 3 shows another embodiment of the invention in which the root 22 of the deflector 20 is pierced by deflector holes 23 allowing the air coming from the annular cavity 12 to flow in the radially-innermost portion of the space situated between the plane portion 24 of the deflector and the end wall 30. Air coming from outside the combustion chamber 100, after penetrating into the annular cavity 12 via the first holes 4 then splits into two flows: the first flow, as in the configuration of FIG. 1, emerges from the annular cavity 12 via its annular orifice 14. The second flow emerges from the annular cavity 12 via the holes 23 in the deflector between the plane portion 24 of the deflector and the end wall 30. The second flow of air thus runs over the radially-innermost portion of the space situated between the plane portion 24 of the deflector and the end wall 30, and advantageously reduces the temperature of the end wall 30, which is the object of the invention. In the example shown, the holes 23 in the deflector are circular and their axes extend radially relative to the axis of the bowl. The holes 23 in the deflector could equally well be perpendicular to said main axis, having a circumferential inclination. They could equally be in the form of slots, or of any other shape.

FIG. 4 shows the shape of the deflector 20 on its own together with its root 22 pierced by holes 23.

Figure 5:
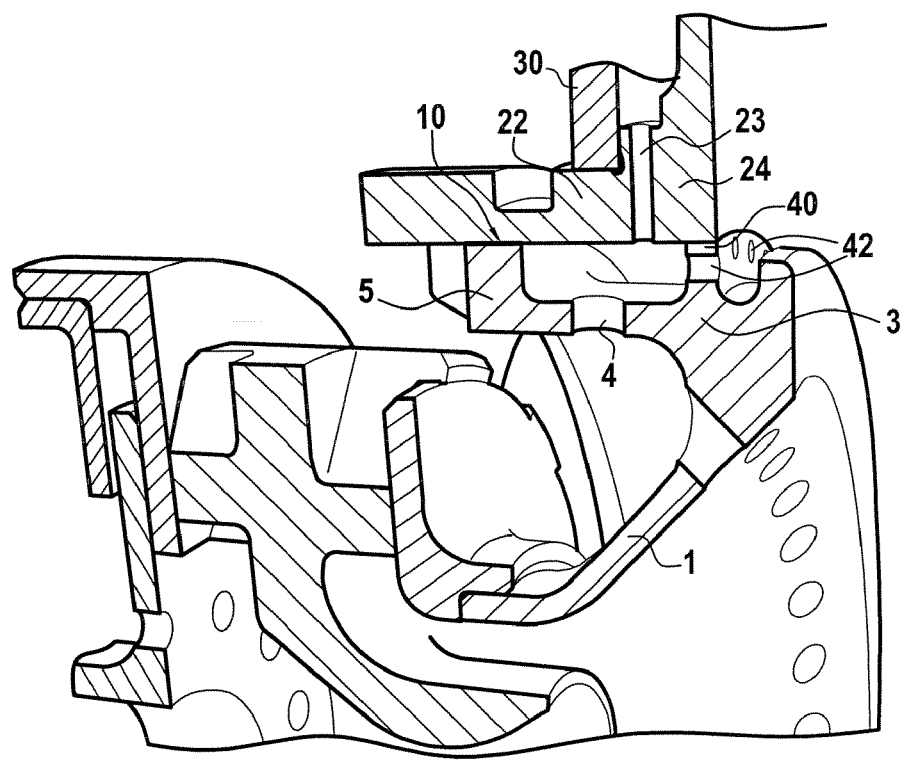
FIG. 5 is a perspective and section view of the chamber end wall, of the deflector, and of the bowl of the invention, when the annular portion possesses towards its downstream end an annular rib that is pierced by second holes, and where the deflector is pierced by holes.

FIG. 5 shows another embodiment of the invention in which the annular portion 3 possesses an annular rib 40 towards its downstream end that comes into contact with the downstream end of the root 22 of the deflector 20, i.e. level with the plane portion 24 of the deflector 20, over a second annular contact zone 16 which, together with the annular first contact zone 10 constitutes the interface between the annular portion 3 and the deflector 20. This annular rib 40 is pierced by second bowl holes 42 through which the air coming from the annular cavity 12 passes to penetrate into the combustion chamber 100 so as to cool the downstream end of the bowl 1. In this embodiment, the annular orifice 14 of FIGS. 1 and 3 is thus replaced by the set of second holes 42.

In the example of FIG. 5, as in the example of FIG. 3, the root 22 of the deflector 20 is pierced by holes 23. Nevertheless, in another configuration (not shown), the downstream end of the annular portion 3 could be provided with an annular rib 40 pierced by second holes 42 without the root 22 of the deflector 20 being pierced by holes 23. Under such circumstances, there is only one flow of air leaving the annular cavity 12, via the second holes 42.

Figure 6:
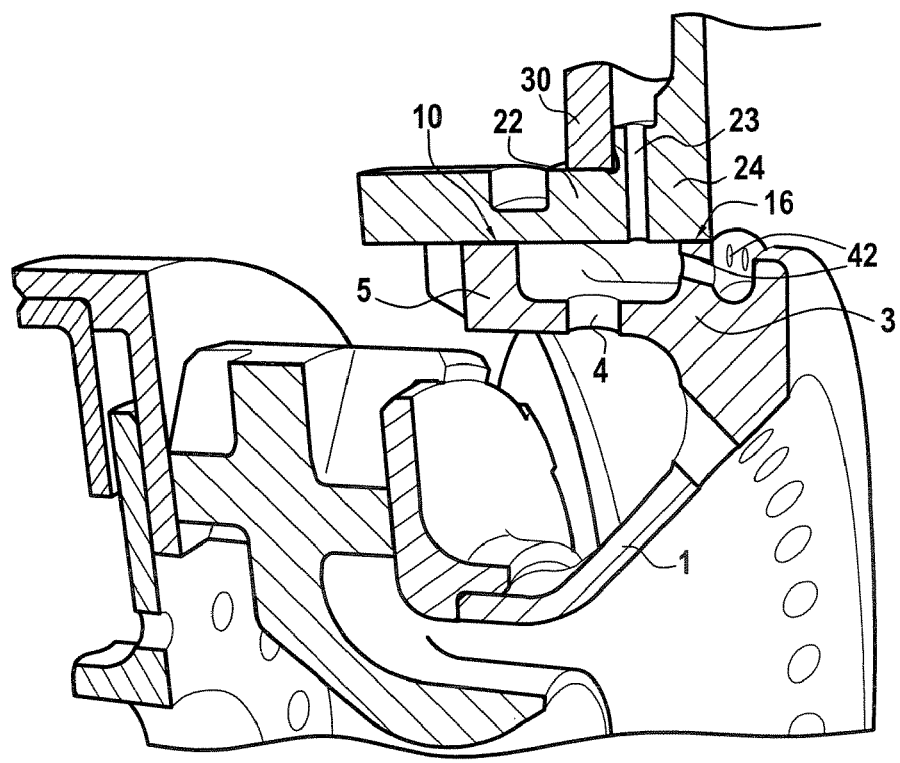
FIG. 6 is a perspective and section view of the chamber end wall, of the deflector, and of the bowl of the invention, when the annular portion possesses towards its downstream end an annular rib pierced by second holes that are inclined relative to the axis of the bowl, and where the deflector is pierced by holes.
Figure 7:
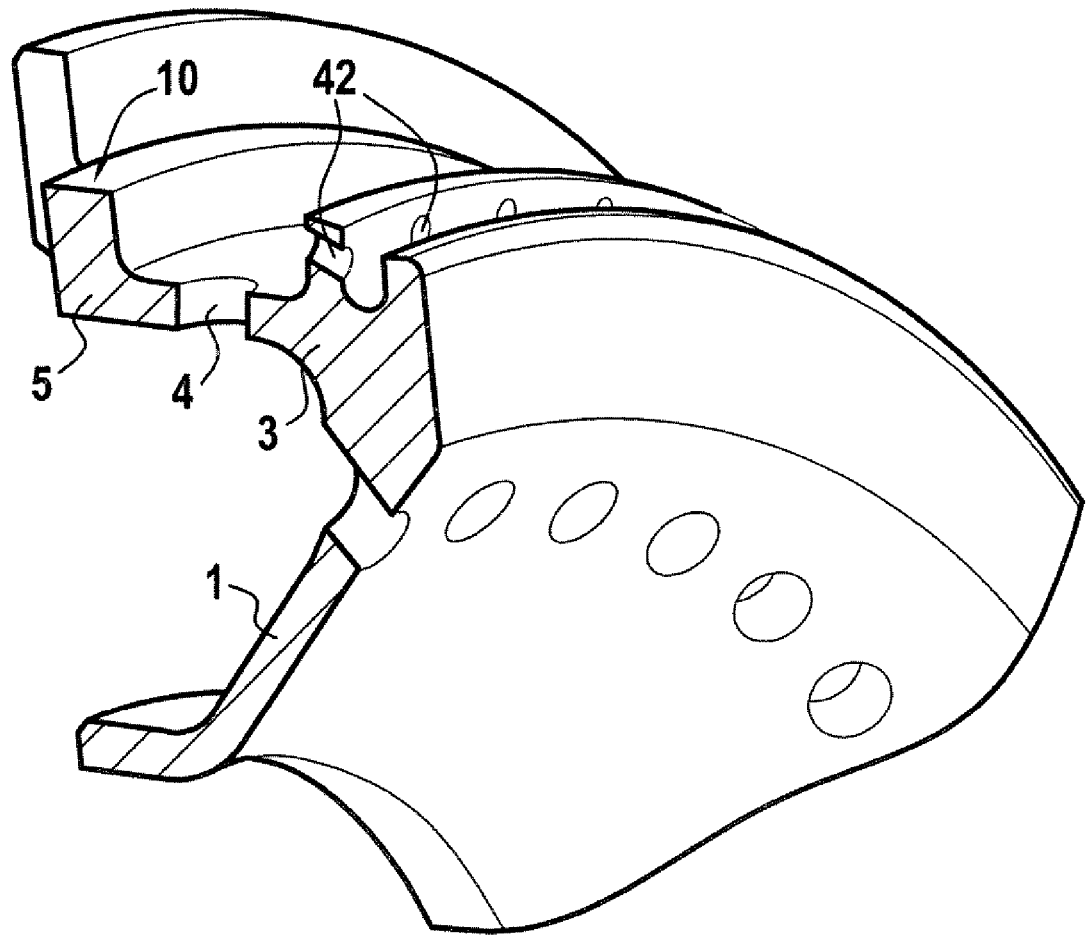
FIG. 7 is a perspective and section view of the FIG. 6 deflector.

In FIG. 5 the axes of the second holes 42 are parallel to the main axis of the bowl. As shown in FIGS. 6 and 7, the axes of the second holes 42 could equally well be inclined relative to the main axis of the bowl. This presents the advantage of more effective cooling of the collar 7 of the bowl 1.

The bowls, deflectors, and chamber end wall shown in FIGS. 1 to 7 are given purely by way of non-limiting example. They could have other shapes within the limits of the scope of the present invention.

What is claimed is:

1. A turbomachine combustion chamber comprising a chamber end wall presenting a plurality of air and fuel injector devices, each of said devices comprising a bowl and a deflector mounted on a main axis forming a heat shield disposed around said bowl, said bowl flaring in the gas flow direction and possessing an annular portion, with the interface between said bowl and said deflector being situated on said annular portion, wherein at least a portion of said interface is situated towards the end of said annular portion that is upstream in the gas flow direction, and wherein an annular cavity is defined between said deflector and said annular portion downstream from said interface, first bowl holes being formed through said annular portion to open out in register with an edge of said chamber end wall, said edge being in contact with a root of said deflector, said first holes enabling a sustained flow of air from upstream to downstream in said annular cavity, the air entering said annular cavity by passing through the first holes and coming to impact directly from said first holes against the root of the deflector in contact with said edge of said end wall.

2. A combustion chamber according to claim 1, wherein said first holes are circular.

3. A combustion chamber according to claim 1, wherein said first holes are slots.

4. A combustion chamber according to claim 1, wherein said first holes are oriented radially relative to said main axis.

5. A combustion chamber according to claim 1, wherein said first holes are perpendicular to said main axis, with a circumferential inclination.

6. A combustion chamber according to claim 1, wherein all of said interface is situated towards the end of said annular portion that is situated upstream in the gas flow direction, such that said cavity opens out via an annular orifice into said combustion chamber.

7. A combustion chamber comprising a chamber end wall presenting a plurality of air and fuel injector devices, each of said devices comprising a bowl and a deflector mounted on a main axis forming a heat shield disposed around said bowl, said bowl flaring in the gas flow direction and possessing an annular portion, with the interface between said bowl and said deflector being situated on said annular portion, wherein at least a portion of said interface is situated towards the end of said annular portion that is upstream in the gas flow direction, and wherein an annular cavity is defined between said deflector and said annular portion downstream from said interface, first bowl holes being formed through said annular portion to open out in register with the edge of said chamber end wall, said edge being in contact with said deflector, said first holes enabling a sustained flow of air from upstream to downstream in said annular cavity, the air entering said annular cavity by passing through the first holes and coming to impact directly against a portion of the deflector in contact with said edge of said end wall,
wherein said annular portion possesses an annular rib towards its downstream end, which rib is in contact with said deflector over a contact zone that constitutes the remaining portion of said interface, said annular rib being pierced by second bowl holes, the air coming from said annular cavity being capable of flowing through said second holes so as to cool the downstream end of said bowl.

8. A combustion chamber according to claim 7, wherein the axes of said second holes are parallel to said main axis.

9. A combustion chamber according to claim 7, wherein the axes of said second holes are inclined relative to said main axis.

10. A combustion chamber comprising a chamber end wall presenting a plurality of air and fuel injector devices, each of said devices comprising a bowl and a deflector mounted on a main axis forming a heat shield disposed around said bowl, said bowl flaring in the gas flow direction and possessing an annular portion, with the interface between said bowl and said deflector being situated on said annular portion, wherein at least a portion of said interface is situated towards the end of said annular portion that is upstream in the gas flow direction, and wherein an annular cavity is defined between said deflector and said annular portion downstream from said interface, first bowl holes being formed through said annular portion to open out in register with the edge of said chamber end wall, said edge being in contact with said deflector, said first holes enabling a sustained flow of air from upstream to downstream in said annular cavity, the air entering said annular cavity by passing through the first holes and coming to impact directly against a portion of the deflector in contact with said edge of said end wall,
wherein all of said interface is situated towards the end of said annular portion that is situated upstream in the gas flow direction, such that said cavity opens out via an annular orifice into said combustion chamber, and
wherein said deflector is pierced by holes enabling air coming from said annular cavity to penetrate between said deflector and said chamber end wall.

11. A combustion chamber according to claim 10, wherein said holes are circular.

12. A combustion chamber according to claim 10, wherein said holes are slots.

13. A combustion chamber according to claim 10, wherein the axes of said holes are oriented radially relative to said main axis.

14. A combustion chamber according to claim 10, wherein the axes of said holes are perpendicular to said main axis, with a circumferential inclination.

15. A turbomachine including a combustion chamber according to claim 1.

16. A combustion chamber according to claim 1, wherein said edge of said chamber end wall has an inner circumferential surface, and wherein each of said first holes is oriented along an axis that intersects said inner circumferential surface.

17. A combustion chamber according to claim 1, wherein said root has a portion located between said annular portion of said bowl and said edge of said chamber end wall.

18. A combustion chamber according to claim 17, wherein said first holes face an inside face of said portion of said root.

19. A combustion chamber according to claim 18, wherein said edge contacts an outside face of said portion of said root.

20. A combustion chamber according to claim 1, wherein said first holes face said edge of said chamber end wall.

* * * * *